(12) United States Patent
Liu et al.

(10) Patent No.: US 11,161,629 B2
(45) Date of Patent: Nov. 2, 2021

(54) SYSTEM FOR NUMERICAL SIMULATION AND TEST VERIFICATION OF ICING CHARACTERISTICS OF AN AEROSTAT

(71) Applicant: AEROSPACE INFORMATION RESEARCH INSTITUTE, CHINESE ACADEMY OF SCIENCES, Beijing (CN)

(72) Inventors: Qiang Liu, Beijing (CN); Yanchu Yang, Beijing (CN); Yanxiang Cui, Beijing (CN); Jingjing Cai, Beijing (CN); Rongchen Zhu, Beijing (CN); Kaibin Zhao, Beijing (CN)

(73) Assignee: AEROSPACE INFORMATION RESEARCH INSTITUTE, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/256,651

(22) PCT Filed: Nov. 11, 2019

(86) PCT No.: PCT/CN2019/117245
§ 371 (c)(1),
(2) Date: Dec. 29, 2020

(87) PCT Pub. No.: WO2021/088097
PCT Pub. Date: May 14, 2021

(65) Prior Publication Data
US 2021/0245898 A1    Aug. 12, 2021

(30) Foreign Application Priority Data

Nov. 7, 2019 (CN) .......................... 201911084221.0

(51) Int. Cl.
*G06F 30/20* (2020.01)
*B64F 5/60* (2017.01)
*G06F 111/10* (2020.01)

(52) U.S. Cl.
CPC ................ *B64F 5/60* (2017.01); *G06F 30/20* (2020.01); *G06F 2111/10* (2020.01)

(58) Field of Classification Search
CPC ...... G06F 30/15; G06F 2111/10; G06F 30/20; B64D 15/20; G08G 5/0091; B64F 5/60
See application file for complete search history.

(56) References Cited

U.S. PATENT DOCUMENTS

| 6,125,327 | A * | 9/2000 | Kalenian | G01S 13/955 |
| | | | | 702/3 |
| 6,868,721 | B2 * | 3/2005 | Szilder | B64D 15/20 |
| | | | | 244/134 R |

(Continued)

FOREIGN PATENT DOCUMENTS

| CN | 103264773 A | 8/2013 |
| CN | 203643124 U | 6/2014 |

(Continued)

*Primary Examiner* — Thai Q Phan
(74) *Attorney, Agent, or Firm* — Bayramoglu Law Offices LLC

(57) ABSTRACT

A system for numerical simulation and test verification of icing characteristics of an aerostat includes an aerostat icing characteristic calculation model and an aerostat icing characteristic test system. The aerostat icing characteristic calculation model is configured to obtain icing data of the aerostat through numerical simulation, and the aerostat icing characteristic test system is configured to obtain icing characteristic data of the aerostat through a physical simulation test. The calculation result obtained through the numerical simulation and the test result obtained through the physical simulation test are mutually verified and improved, so as to (Continued)

facilitate the in-depth research and accurate analysis of the icing characteristics of the aerostat.

9 Claims, 4 Drawing Sheets

(56) References Cited

U.S. PATENT DOCUMENTS

| | | | | |
|---|---|---|---|---|
| 8,777,163 | B2* | 7/2014 | Safai | B64D 15/12 |
| | | | | 244/134 D |
| 9,558,672 | B2* | 1/2017 | McCann | G01W 1/00 |
| 2003/0098438 | A1* | 5/2003 | Haslin | C09K 3/185 |
| | | | | 252/70 |
| 2004/0155151 | A1* | 8/2004 | Szilder | B64D 15/20 |
| | | | | 244/134 F |
| 2014/0257770 | A1* | 9/2014 | Lu | G06F 30/15 |
| | | | | 703/2 |
| 2014/0257771 | A1* | 9/2014 | Lu | G06F 30/20 |
| | | | | 703/2 |
| 2018/0292826 | A1* | 10/2018 | DeFelice | G08G 5/0091 |
| 2020/0018147 | A1* | 1/2020 | Kleinguetl | E21B 47/10 |

FOREIGN PATENT DOCUMENTS

| | | |
|---|---|---|
| CN | 106608372 A | 5/2017 |
| CN | 109696289 A | 4/2019 |
| CN | 110217412 A | 9/2019 |
| WO | 2013078629 A1 | 6/2013 |

\* cited by examiner

```
┌─────────────────────────────────────┐
│ Aerostat temperature field-flow field│
│ characteristic calculation module    │
└─────────────────────────────────────┘
         │                │
         │                ▼
         │      ┌─────────────────────────┐
         │      │ Aerostat supercooled    │
         │      │ water droplet impingement│
         │      │ characteristic calculation│
         │      │ module                  │
         │      └─────────────────────────┘
         │                │
         ▼                ▼
┌─────────────────────────────────────┐
│ Aerostat surface ice growth         │
│ calculation module                  │
└─────────────────────────────────────┘
```

FIG. 1

SYSTEM FOR NUMERICAL SIMULATION AND TEST VERIFICATION OF ICING CHARACTERISTICS OF AN AEROSTAT

CROSS REFERENCE TO THE RELATED APPLICATIONS

This application is the national phase entry of International Application No. PCT/CN2019/117245, filed on Nov. 11, 2019, which is based upon and claims priority to Chinese Patent Application No. 201911084221.0, filed on Nov. 7, 2019, the entire contents of which are incorporated herein by reference.

TECHNICAL FIELD

The present invention relates to the technical field of thermal control of high-altitude balloons, in particular to a system for numerical simulation and test verification of icing characteristics of an aerostat.

BACKGROUND

An aerostat is filled with a buoyant gas that has a lower density than air to gain its lift and remain aloft. During lift-off and high-altitude flight, the surface of the aerostat accumulates ice when passing through the clouds at a low temperature, which significantly affects the flight performance of the aerostat. A numerical simulation and test verification system capable of comprehensively testing and estimating icing characteristics of an aerostat, however, remains absent in the prior art.

SUMMARY

To overcome the above-mentioned shortcomings of the prior art, an objective of the present invention is to provide a system for numerical simulation and test verification, which can comprehensively test and estimate icing characteristics of an aerostat.

The technical solutions of the present invention are as follows.

A system for numerical simulation and test verification of icing characteristics of an aerostat, including:

an aerostat icing characteristic calculation model, wherein the aerostat icing characteristic calculation model is configured to obtain icing data of the aerostat through numerical simulation; and an aerostat icing characteristic test system, wherein the aerostat icing characteristic test system is configured to obtain icing characteristic data of the aerostat through a physical simulation test.

The icing data of the aerostat obtained through the numerical simulation and the icing characteristic data of the aerostat obtained through the physical simulation test are mutually verified and mutually improved, to provide a basis for the numerical simulation and the test verification for in-depth research and accurate analysis of the icing characteristics of the aerostat.

Further, the aerostat icing characteristic test system includes: the aerostat, which is an icing characteristic test object; a water droplet ejector for simulating a rainfall; an ambient data acquisition module for measuring ambient data; an aerostat pressure difference data acquisition module for measuring the pressure difference between the inside and outside of the aerostat; a tensile test module for measuring buoyancy lift of the aerostat; a data storage and processing module for storing and processing data transmitted from each module; a test state recording module for recording changes in the icing characteristics of the aerostat during the test; a low-temperature environmental laboratory for providing an indoor temperature of 0-20° C. The water droplet ejector is provided above the aerostat. The ambient data acquisition module, the aerostat pressure difference data acquisition module and the tensile test module are connected to the data storage and processing module. The tensile test module is connected to a tether of the aerostat.

Further, the aerostat includes an airship, a tethered balloon, a zero-pressure balloon or a super-pressure balloon.

Further, the aerostat icing characteristic calculation model includes: an aerostat temperature field-flow field characteristic calculation module, an aerostat supercooled water droplet impingement characteristic calculation module, and an aerostat surface ice growth calculation module.

Further, the modeling of the aerostat icing characteristic calculation model includes: calculating flight parameters of the aerostat and design parameters of the aerostat according to a flight mission requirement of the aerostat; calculating atmospheric environment parameters of the aerostat and thermal environment parameters of the aerostat; and based on a geometric characteristic and a heat transfer mode of the aerostat, establishing the aerostat temperature field-flow field characteristic calculation module.

Further, the modeling of the aerostat icing characteristic calculation model includes: establishing the aerostat supercooled water droplet impingement characteristic calculation module by using the aerostat temperature field-flow field characteristic calculation module.

Further, the modeling of the aerostat icing characteristic calculation model includes: establishing the aerostat surface ice growth calculation module by using the aerostat temperature field-flow field characteristic calculation module and the aerostat supercooled water droplet impingement characteristic calculation module.

Further, the icing characteristic data of the aerostat includes icing thickness and icing distribution on the surface of the aerostat.

Further, test conditions of the aerostat icing characteristic test system are the same as boundary conditions of the aerostat icing characteristic calculation model.

The present invention has the following advantages. The icing characteristic data of the aerostat is obtained by means of numerical simulation and a physical simulation test, and the calculation result obtained by the numerical simulation and the test result obtained by the physical simulation test are mutually verified and improved, thereby facilitating the in-depth research and accurate analysis of the icing characteristics of the aerostat.

BRIEF DESCRIPTION OF THE DRAWINGS

FIG. 1 is a schematic diagram of the composition of the aerostat icing characteristic calculation model;

Figure 2:
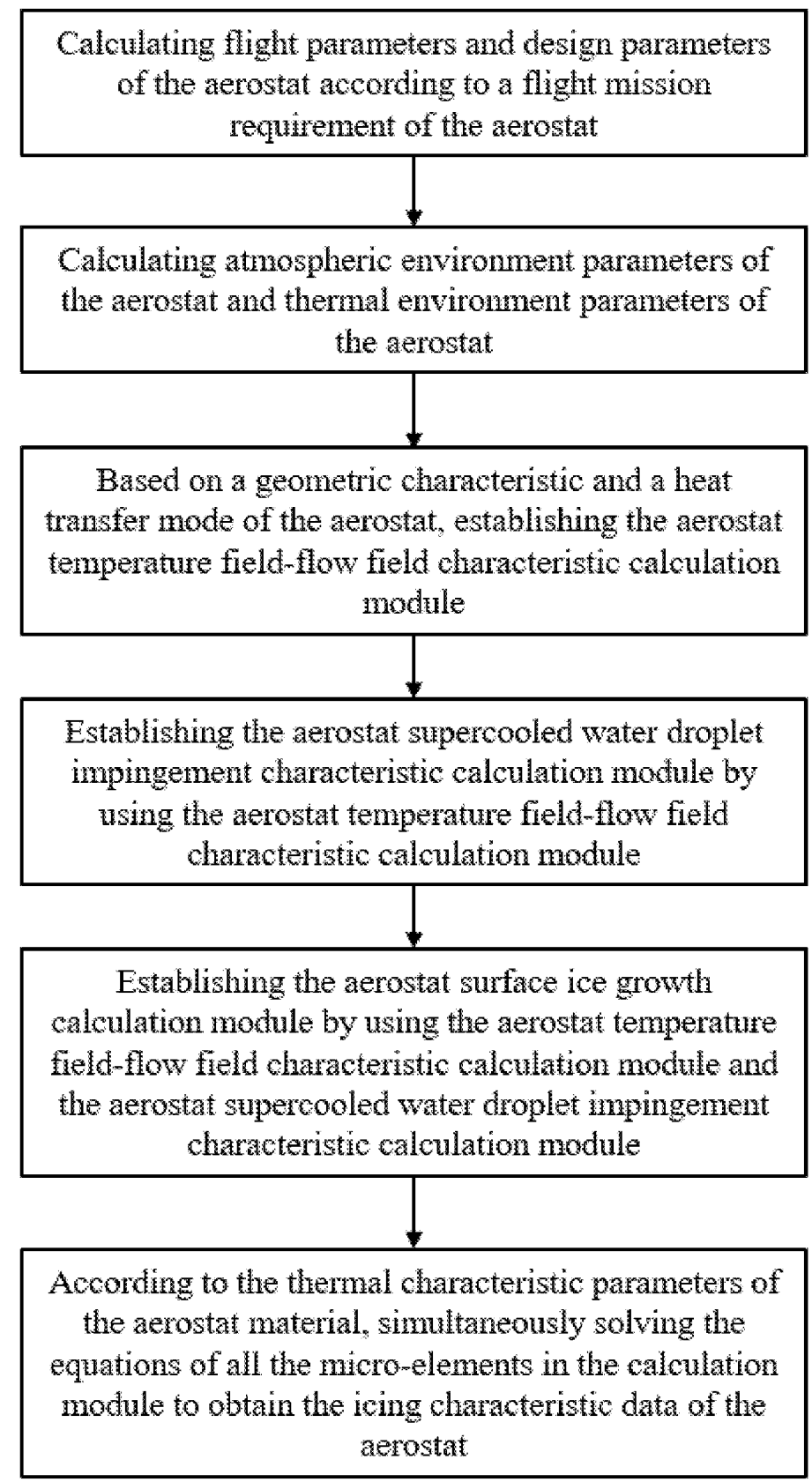
FIG. 2 is a schematic flow chart of an aerostat icing characteristic calculation method.
Figure 3:
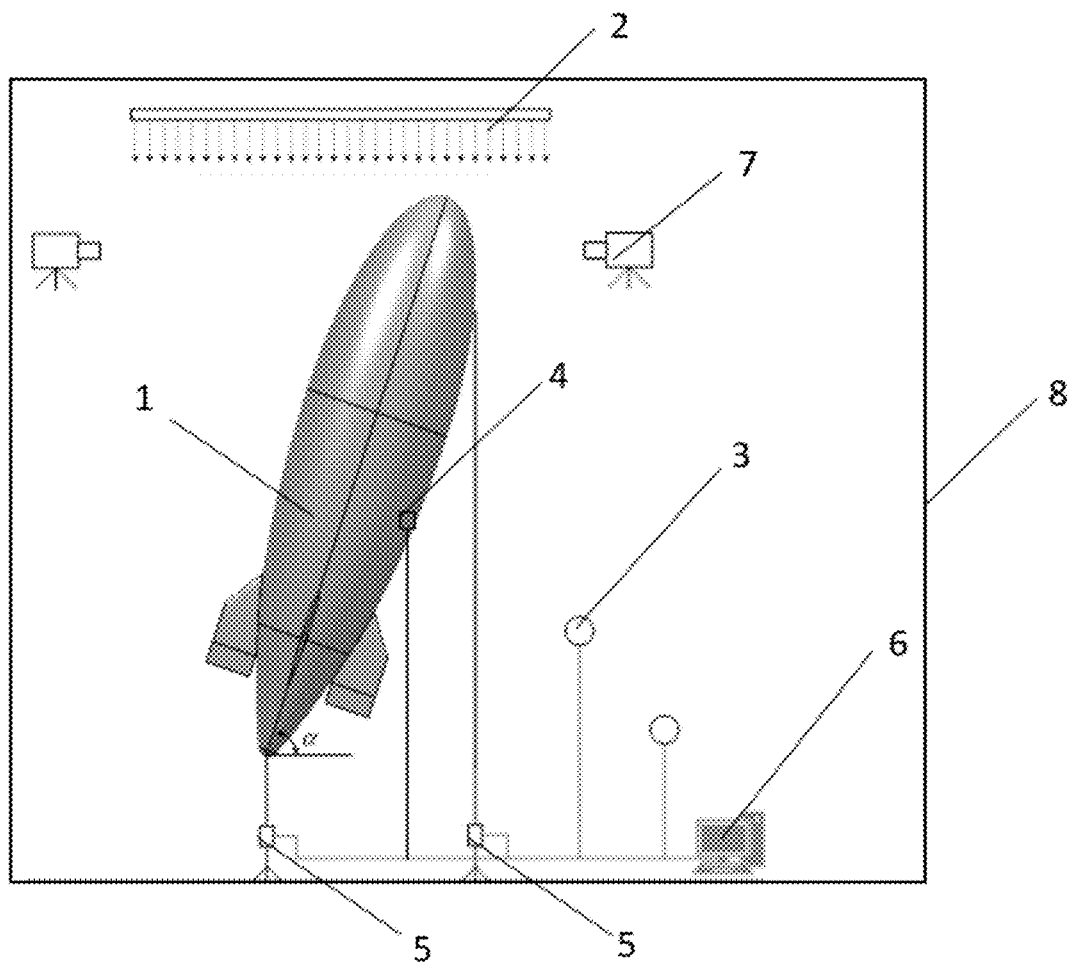
FIG. 3 is a schematic diagram of the structure of the icing characteristic test system of an airship.
Figure 4:
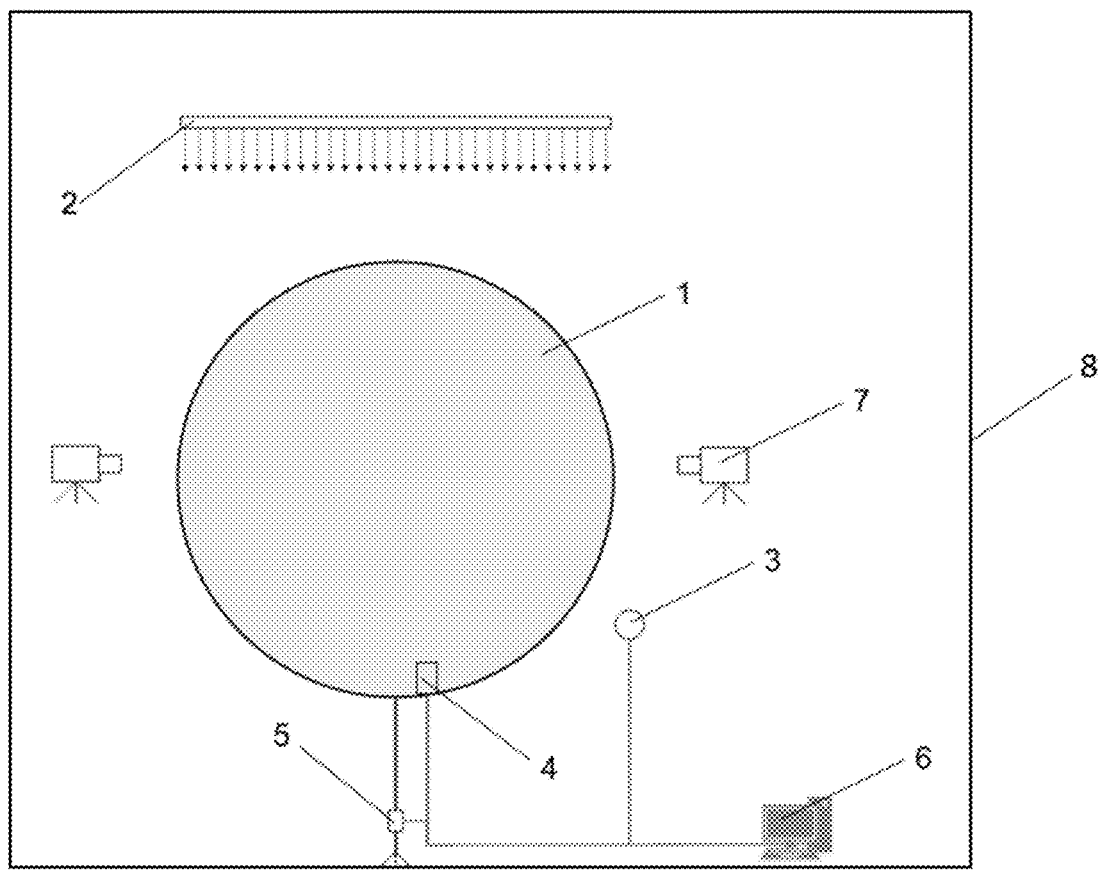
FIG. 4 is a schematic diagram of the structure of the icing characteristics test system of a spherical aerostat.

In the figures: 1—aerostat; 2—water droplet ejector; 3—ambient data acquisition module; 4—aerostat pressure difference data acquisition module; 5—tensile test module;

6—data storage and processing module; 7—test state recording module; 8—low-temperature environmental laboratory.

DETAILED DESCRIPTION OF THE EMBODIMENTS

The technical solutions in the embodiments of the present invention will be clearly and completely described below with reference to the drawings in the embodiments of the present invention. Obviously, the described embodiments are only a part of the embodiments of the present invention, rather than all the embodiments. Based on the embodiments of the present invention, all other embodiments obtained by those skilled in the art without creative efforts shall fall within the scope of protection of the present invention.

A system for numerical simulation and test verification of icing characteristics of an aerostat, includes: an aerostat icing characteristic calculation model and an aerostat icing characteristic test system. The aerostat icing characteristic calculation model is configured to obtain icing data of the aerostat through numerical simulation. The aerostat icing characteristic test system is configured to obtain icing characteristic data of the aerostat through a physical simulation test. The calculation result obtained through the numerical simulation and the test result obtained through the physical simulation test are mutually verified and improved, so as to facilitate the in-depth research and accurate analysis of the icing characteristics of the aerostat.

The icing process on the surface of the aerostat includes the following steps: (1) the supercooled water droplets flow in the flow field around the aerostat and strike the windward surface of the aerostat; (2) a part of the supercooled water droplets that strike the windward surface of the aerostat are attached to the surface of the aerostat to form a water film flow, and some of the supercooled water droplets bounce and splash off the surface of the aerostat; and (3) the water film attached to the surface of the aerostat freezes after heat transfer.

According to the above three steps, the aerostat icing characteristic calculation model includes three calculation modules: an aerostat temperature field-flow field characteristic calculation module, an aerostat supercooled water droplet impingement characteristic calculation module, and an aerostat surface ice growth calculation module. The relationships between these modules are shown in FIG. 1.

A method of modeling the aerostat icing characteristic calculation model includes the following steps:

S100, flight parameters and design parameters of the aerostat are calculated according to a flight mission requirement of the aerostat; wherein the flight parameters of the aerostat include a flight time of the aerostat, a longitude of a flight location of the aerostat, a latitude of the flight location of the aerostat, a flight altitude of the aerostat and a flight airspeed of the aerostat; and the design parameters of the aerostat include the volume of the aerostat, the length of the aerostat, the maximum diameter of the aerostat, the surface area of the aerostat and the solar cell area.

S200, atmospheric environment parameters and thermal environment parameters of the aerostat are calculated; wherein the atmospheric environment parameters of the aerostat include the atmospheric temperature, atmospheric pressure and atmospheric density at the flight altitude of the aerostat; and the thermal environment parameters of the aerostat include radiant heat environment parameters and convective heat transfer environment parameters of the aerostat; the radiant heat environment parameters of the aerostat include direct solar radiation heat flux, atmospheric scattering solar radiation heat flux, and ground reflection solar radiation heat flux, atmospheric long-wave radiation heat flux and ground long-wave radiation heat flux.

S300, based on the geometric characteristic and the heat transfer mode of the aerostat, the aerostat temperature field-flow field characteristic calculation module is established; wherein a three-dimensional model of the aerostat is established by using the CATIA software, the three-dimensional model is imported into the CFD/ICEM software to create a computational domain, and an unstructured grid is generated to discretize the computational domain, so as to complete the modeling of the finite element model of the aerostat; and in CFD/FLUENT software, based on the three-dimensional Navier-Stokes equations, the radiant heat environment parameters and the convective heat transfer environment parameters of the aerostat are used as boundary conditions and loaded on the finite element model of the aerostat; the coupling characteristics of the temperature field and the flow field are solved by the semi-implicit method for pressure linked equations (SIMPLE); and the convection terms and diffusion terms are discretized by the second-order discrete scheme, so as to establish the aerostat temperature field-flow field characteristic calculation module.

S400, the aerostat supercooled droplet impingement characteristic calculation module is established by using the aerostat temperature field-flow field characteristic calculation module; wherein the calculation results of the finite element model of the aerostat and external flow field data in CFD/FLUENT are imported into FENSAP-ICE software; in the FENSAP-ICE software, based on the Eulerian two-phase flow theory and some reasonable settings, the flow mass and momentum conservation equations of the supercooled water droplets are established, so as to establish the aerostat supercooled droplet impingement characteristic calculation module.

The reasonable settings include:

the shape of the supercooled water droplet is spherical;

when flowing in the flow field around the aerostat, the supercooled water droplets will not deform and will not exchange heat with the environment before striking or flowing over the surface of the aerostat; and the turbulence of the flow field of the aerostat has no effect on the flow field of the supercooled water droplets.

S500, the aerostat surface ice growth calculation module is established by using the aerostat temperature field-flow field characteristic calculation module and the aerostat supercooled droplet impingement characteristic module, so as to complete the modeling of the aerostat icing characteristic calculation model.

The calculation results of the finite element model of the aerostat and external flow field data in CFD/FLUENT and the calculation results of the supercooled droplet impingement calculation module are imported into the FENSAP-ICE software; in the FENSAP-ICE software, the surface temperature, friction resistance and heat flux data of the aerostat are obtained by using the aerostat temperature field-flow field characteristic calculation module, and the supercooled droplet collection efficiency on the surface of the aerostat is obtained by using the supercooled droplet impingement calculation module, to establish the mass and energy conservation equations of the surface ice growth of the aerostat, so as to establish the aerostat surface ice growth calculation module.

Through the aerostat icing characteristic calculation model, according to the thermal characteristic parameters of the aerostat material, the equations of all the micro-elements in the calculation module are solved simultaneously to obtain the icing characteristic data of the aerostat. The icing characteristic data of the aerostat includes the icing thickness and icing distribution on the surface of the aerostat, which provides a basis for numerical calculations for the aerostat test.

The aerostat icing characteristic test system includes the aerostat 1, the water droplet ejector 2, the ambient data acquisition module 3, the aerostat pressure difference data acquisition module 4, the tensile test module 5, the data storage and processing module 6, the test state recording module 7 and the low-temperature environmental laboratory 8.

The ambient data acquisition module 3, the aerostat pressure difference data acquisition module 4 and the tensile test module 5 are connected to the data storage and processing module 6. The tensile test module 5 is connected to a tether of the aerostat and configured to measure the buoyancy lift of the aerostat. The buoyancy lift of the aerostat is equal to the buoyancy of the aerostat minus the weight of the aerostat.

The aerostat 1 is the icing characteristic test object and includes an airship, a tethered balloon, a zero-pressure balloon or a super-pressure balloon and the like.

The water droplet ejector 2 is arranged above the aerostat 1. The water droplet ejector 2 includes a main pipe and a series of nozzles, and is configured to simulate a rainfall. The nozzles eject a mixed fluid of air and water droplets. The diameter, spray water content and flow rate of the water droplets in the mixed fluid can be adjusted by adjusting the nozzles. The spray water content refers to the mass of water droplets per cubic meter of air.

The ambient data acquisition module 3 includes an ambient atmospheric temperature measuring instrument, an ambient atmospheric pressure measuring instrument, an ambient atmospheric humidity measuring instrument, and an ambient wind speed and wind direction measuring instrument, which are configured to measure ambient atmospheric temperature data, ambient atmospheric pressure data, ambient atmospheric humidity data and ambient wind speed and wind direction data, respectively.

The aerostat pressure difference data acquisition module 4 includes a differential pressure sensor, which is configured to measure the pressure difference between the inside and outside the aerostat.

The tensile test module 5 includes a tensiometer, which is configured to measure the buoyancy lift of the aerostat.

The data storage and processing module 6 mainly includes the computer hardware and the data processing software, which are configured to store and process the data transmitted from each module.

The test state recording module 7 includes two cameras, which are configured to record the changes in the icing characteristics of the aerostat during the test.

The low-temperature environmental laboratory 8 is configured to provide an indoor temperature of 0-20° C.

All data are collected and stored in the computer. The test data is used to verify and perfect the aerostat icing characteristic calculation model.

A method of testing icing characteristics of the aerostat using the aerostat icing characteristic test system includes the following steps:

Step S1, data acquisition instruments are connected to the data storage and processing module, and their running states are debugged.

Step S101, the ambient data acquisition module, the aerostat pressure difference data acquisition module, and the tensile test module are connected to the data storage and processing module; the ambient data acquisition module, the aerostat pressure difference data acquisition module, and the tensile test module are turned on; and it is ensured that the ambient data acquisition module and the tensile test module function normally so that the collected data is accurate.

Step S102, the test state recording module is debugged to ensure that the test state recording module functions normally.

Step S2, the low-temperature environmental laboratory is prepared.

Step S201, the low-temperature environmental laboratory is opened, and it is ensured that the low-temperature environmental laboratory functions normally so that the indoor temperature can be adjusted.

Step S202, the indoor temperature is adjusted according to the requirements for the test.

Step S3, the water droplet ejector is debugged.

Step S301, the water droplet ejector is turned on, and it is ensured that the water droplet ejector functions normally so that the diameter, spray water content and flow rate of the ejected water droplets can be adjusted.

Step S302, the diameter, spray water content and flow rate of the water droplets are adjusted according to the requirements for the test.

Step S4, the data acquisition module is installed on the aerostat, and the aerostat is debugged.

Step S401, the aerostat pressure difference data acquisition module is installed on the aerostat, and the aerostat pressure difference data acquisition module is connected to the data storage and processing module.

Step S402, the aerostat is filled with helium and moved under the water droplet ejector, and then the aerostat is connected to the tensile test module and fixed on the ground.

Step S5, the icing characteristics of the aerostat are tested, and the test conditions of the aerostat icing characteristic test are the same as the boundary conditions of the aerostat icing characteristic calculation model.

The aerostat surface icing characteristics are affected by six factors including ambient temperature, aerostat pressure difference, water droplet diameter, spray water content, flow rate and icing time. The test method uses a single variable method to quantitatively test the effect of each factor on the aerostat icing characteristics. Reference values of the ambient temperature, the aerostat pressure difference, the water droplet diameter, the spray water content, the flow rate and the icing time are set, and five of these variables are kept unchanged at their respective reference values, and the sixth variable changes separately and fluctuates around its reference value.

Step S510, under the same ambient temperature, aerostat pressure difference, water droplet diameter, spray water content, and flow rate conditions, that is, when the ambient temperature, the aerostat pressure difference, the water droplet diameter, spray water content, and the flow rate are their respective reference values, changes in the icing characteristics of the aerostat are measured under different icing time conditions.

Step S511, the environmental laboratory is opened, the indoor temperature is adjusted to the ambient temperature required for the test, the aerostat pressure difference is set as its reference value, and the buoyancy lift of the aerostat is measured when the aerostat does not freeze.

Step S512, the water droplet diameter, the spray water content, the flow rate, and the aerostat pressure are kept as their respective reference values, and changes in the buoyancy lift of the aerostat with the icing time are measured.

Step S513, the buoyancy lift data of the aerostat measured by step S512 is subtracted from the buoyancy lift data of the aerostat measured by step S511 to obtain the icing quality on the surface of the aerostat in different icing time conditions under certain ambient temperature, water droplet diameter, spray water content, flow rate and aerostat pressure difference.

Step S514, after step S513, the water film on the surface of the aerostat is wiped.

Step S520, step S510 is repeated by fixing the other five parameters and changing the variable to the ambient temperature, the aerostat pressure difference, the water droplet diameter, the spray water content, and the flow rate in sequence, to measure the aerostat surface icing characteristics under the effect of each factor.

Step S5 further includes: the changes in the aerostat icing state are recorded by using the test state recording module during the test.

Step S6, after the test is completed, the test data is processed and analyzed, so as to mutually verify and perfect the calculation results of the aerostat icing characteristic calculation model.

The above embodiment is a preferred embodiment of the present invention, but the implementation mode of the present invention is not limited thereto. Any other changes, modifications, substitutions, combinations and simplifications made without departing from the spiritual essence and principle of the present invention shall be regarded as equivalent replacement methods, and shall fall within the scope of protection of the present invention.

What is claimed is:

1. A system for numerical simulation and test verification of icing characteristics of an aerostat, comprising:
   an aerostat icing characteristic calculation model, wherein the aerostat icing characteristic calculation model is configured to obtain icing data of the aerostat through the numerical simulation; and
   an aerostat icing characteristic test system, wherein the aerostat icing characteristic test system is configured to obtain icing characteristic data of the aerostat through a physical simulation test, wherein the aerostat icing characteristic test system comprises:
   the aerostat, wherein the aerostat is an icing characteristic test object;
   a water droplet ejector for simulating a rainfall;
   an ambient data acquisition instrument for measuring ambient data;
   an aerostat pressure difference data acquisition sensor for measuring a pressure difference between an inside and an outside of the aerostat;
   a tensiometer for measuring a buoyancy lift of the aerostat;
   a data storage and processing module for storing and processing data transmitted from each of the ambient data acquisition instrument, the aerostat pressure difference data acquisition sensor and the tensiometer;
   two cameras for recording changes in the icing characteristics of the aerostat during the physical simulation test; and
   a low-temperature environmental laboratory for providing an indoor temperature of 0-20° C.; wherein the water droplet ejector is provided above the aerostat; the ambient data acquisition instrument, the aerostat pressure difference data acquisition sensor and the tensiometer are connected to the data storage and processing module; and the tensiometer is connected to a tether of the aerostat, and wherein
   the icing data of the aerostat obtained through the numerical simulation and the icing characteristic data of the aerostat obtained through the physical simulation test are mutually verified, to provide a basis for the numerical simulation and the test verification for in-depth research and accurate analysis of the icing characteristics of the aerostat.

2. The system for the numerical simulation and the test verification of the icing characteristics of the aerostat according to claim 1, wherein
   the water droplet ejector comprises a main pipe and a plurality of nozzles;
   the ambient data acquisition instrument comprises an ambient atmospheric temperature measuring instrument, an ambient atmospheric pressure measuring instrument, an ambient atmospheric humidity measuring instrument, and an ambient wind speed and wind direction measuring instrument;
   the aerostat pressure difference data acquisition sensor comprises a differential pressure sensor; and
   the data storage and processing module comprises a computer hardware and a data processing software.

3. The system for the numerical simulation and the test verification of the icing characteristics of the aerostat according to claim 1, wherein
   the aerostat comprises an airship, a tethered balloon, a zero-pressure balloon or a super-pressure balloon.

4. The system for the numerical simulation and the test verification of the icing characteristics of the aerostat according to claim 1, wherein
   the aerostat icing characteristic calculation model comprises:
   an aerostat temperature field-flow field characteristic calculation module, an aerostat supercooled water droplet impingement characteristic calculation module, and an aerostat surface ice growth calculation module.

5. The system for the numerical simulation and the test verification of the icing characteristics of the aerostat according to claim 4, wherein
   a modeling method of the aerostat icing characteristic calculation model comprises:
   calculating flight parameters of the aerostat and design parameters of the aerostat according to a flight mission requirement of the aerostat;
   calculating atmospheric environment parameters of the aerostat and thermal environment parameters of the aerostat; and
   based on a geometric characteristic and a heat transfer mode of the aerostat, establishing the aerostat temperature field-flow field characteristic calculation module.

6. The system for the numerical simulation and the test verification of the icing characteristics of the aerostat according to claim 4, wherein
   a modeling method of the aerostat icing characteristic calculation model comprises: establishing the aerostat supercooled water droplet impingement characteristic calculation module by using the aerostat temperature field-flow field characteristic calculation module.

7. The system for the numerical simulation and the test verification of the icing characteristics of the aerostat according to claim 4, wherein
a modeling method of the aerostat icing characteristic calculation model comprises:
establishing the aerostat surface ice growth calculation module by using the aerostat temperature field-flow field characteristic calculation module and the aerostat supercooled water droplet impingement characteristic calculation module.

8. The system for the numerical simulation and the test verification of the icing characteristics of the aerostat according to claim 1, wherein
the icing characteristic data of the aerostat comprises an icing thickness and an icing distribution on a surface of the aerostat.

9. The system for the numerical simulation and the test verification of the icing characteristics of the aerostat according to claim 1, wherein
test conditions of the aerostat icing characteristic test system are the same as boundary conditions of the aerostat icing characteristic calculation model.

* * * * *